US009778919B2

(12) United States Patent
Kusmer et al.

(10) Patent No.: US 9,778,919 B2
(45) Date of Patent: Oct. 3, 2017

(54) DUAL CONTEXT INTERACTION WITH A CONTENT OBJECT FOR FACILITATING CONTENT CREATION AND SOFTWARE DEVELOPMENT

(75) Inventors: Steven R. Kusmer, San Francisco, CA (US); King Rhoton, San Francisco, CA (US); Hal R. Schectman, Portola Valley, CA (US); Dietrich W. Schultz, Foster City, CA (US); Michael P. Thompson, San Carlos, CA (US); Kevin G. Wallace, San Francisco, CA (US); Brian D. Herring, Durham, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2934 days.

(21) Appl. No.: 10/877,488

(22) Filed: Jun. 25, 2004

(65) Prior Publication Data
US 2014/0245257 A1    Aug. 28, 2014

Related U.S. Application Data

(60) Provisional application No. 60/483,051, filed on Jun. 27, 2003.

(51) Int. Cl.
| | |
|---|---|
| *G06F 3/0481* | (2013.01) |
| *G06F 9/44* | (2006.01) |
| *G06F 3/0484* | (2013.01) |
| *G06F 17/30* | (2006.01) |
| *H04L 12/18* | (2006.01) |

(52) U.S. Cl.
CPC .............. *G06F 8/34* (2013.01); *G06F 3/0484* (2013.01); *G06F 17/30424* (2013.01); *G06F 3/0481* (2013.01); *H04L 12/1813* (2013.01)

(58) Field of Classification Search
CPC ..... G06F 3/00; H04L 2/1822; H04L 12/1813; G06Q 10/10
USPC ....................................... 715/760, 744, 762
See application file for complete search history.

(56) References Cited

U.S. PATENT DOCUMENTS

| | | | | |
|---|---|---|---|---|
| 5,740,444 | A  * | 4/1998 | Frid-Nielsen | 717/102 |
| 6,101,510 | A  * | 8/2000 | Stone et al. | 715/234 |
| 6,151,609 | A  * | 11/2000 | Truong | 715/205 |
| 6,268,852 | B1 * | 7/2001 | Lindhorst et al. | 715/744 |

(Continued)

*Primary Examiner* — Doon Chow
*Assistant Examiner* — Le Nguyen
(74) *Attorney, Agent, or Firm* — Kilpatrick Townsend & Stockton LLP

(57) ABSTRACT

A software module is presented that enables a user to efficiently switch between interacting with a content object in a first context and a second context. Information from the first context is used when switching to the second context and vice versa, thereby decreasing the overhead associated with switching contexts. In one embodiment, the content object is an HTML file, the first context is the file as it appears in a web browser, and the second context is the file in editable format. In one embodiment, when the web browser is directed to a "context-switch URL," a modified web server extracts information from the context-switch URL and switches the context from the first context to the second. In one embodiment, a person initiates a context-switch by pushing a button on the web browser. This causes a context-switch URL to be generated and directs the web browser to the context-switch URL.

22 Claims, 19 Drawing Sheets

(56) References Cited

U.S. PATENT DOCUMENTS

| | | | |
|---|---|---|---|
| 6,297,819 B1* | 10/2001 | Furst | 715/733 |
| 6,298,319 B1* | 10/2001 | Heile et al. | 703/26 |
| 6,571,295 B1* | 5/2003 | Sidana | 709/246 |
| 6,724,401 B1* | 4/2004 | Hennum et al. | 715/765 |
| 6,922,814 B2* | 7/2005 | Sirhall | 715/769 |
| 7,007,231 B2* | 2/2006 | Dang | 715/213 |
| 7,143,344 B2* | 11/2006 | Parker et al. | 715/236 |
| 7,164,486 B1* | 1/2007 | Nakamura et al. | 358/1.15 |
| 8,196,029 B1* | 6/2012 | Rucker et al. | 715/200 |
| 2002/0104071 A1* | 8/2002 | Charisius et al. | 717/109 |
| 2003/0028801 A1* | 2/2003 | Liberman et al. | 713/200 |
| 2003/0051228 A1* | 3/2003 | Martinez et al. | 717/109 |
| 2003/0061283 A1* | 3/2003 | Dutta et al. | 709/204 |
| 2003/0105816 A1* | 6/2003 | Goswami | 709/204 |
| 2003/0151628 A1* | 8/2003 | Salter | 345/773 |
| 2004/0030598 A1* | 2/2004 | Boal | 705/14 |
| 2004/0049374 A1* | 3/2004 | Breslau et al. | 704/2 |
| 2004/0148576 A1* | 7/2004 | Matveyenko et al. | 715/530 |
| 2004/0221231 A1* | 11/2004 | Madril et al. | 715/527 |
| 2004/0225658 A1* | 11/2004 | Horber | 707/9 |
| 2005/0022128 A1* | 1/2005 | Nicholas et al. | 715/731 |

* cited by examiner

```
To: joe_reviewer@mycompany.com
CC: joe-boss@mycompany.com
From: joe-editor@mycompany.com
Subject: [Company site] Could you Hi Joe R., I found some outdated information in our partner section, revolving
around the Smith partnership. Please research the right information and
update the page.

Thanks,

Joe E.

Page is live at location:
http://www.mycompany.com/pressreleases/record_quarter.htm Page is staged at location:
http://content.atomz.com/pb00001fb8/pressreleases/record_quarter.htm Preview this page by clicking:
https://center.atomz.com/view/pb12345678/pressreleases/record_quarter.htm Edit this page by clicking:
https://center.atomz.com/edit/pb12345678/pressreleases/record_quarter.htm
```

DUAL CONTEXT INTERACTION WITH A CONTENT OBJECT FOR FACILITATING CONTENT CREATION AND SOFTWARE DEVELOPMENT

CROSS-REFERENCE TO RELATED APPLICATION

This application claims priority from the following U.S. provisional patent application, which is hereby incorporated by reference: Ser. No. 60/483,051, filed on Jun. 27, 2003, entitled "Site-Centered Content Management".

BACKGROUND OF THE INVENTION

Field of the Invention

The present invention is related to facilitating content creation and software development and, more particularly, to a mechanism for switching between a user context and a creator or developer context.

Description of the Background Art

A content object, such as a text file, a software program, or an image, is merely a collection of machine data. Only when this data is interpreted in a specific way can humans understand it. In general, there are at least two contexts in which a person can interact with a content object. The first context is as a user, reviewer, or tester and involves viewing or using the content object. The second context is as a developer or content creator and involves modifying or creating the content object using a development environment.

For example, if the content object is a web page (e.g., a file containing HTML code), the first context is the web page that appears when the HTML file is loaded into a web browser. The second context is an application that enables someone to edit the HTML file or create a new HTML file. This editing application can be, for example, Macromedia® Dreamweaver®, Microsoft® FrontPage®, or a basic text editor.

As another example, if the content object is a software program (e.g., a file containing source code), the first context is the user interface that appears when the program (executable or object code) is executed. The second context is an application that enables someone to edit the program (source code) or create a new program. This editing application can be, for example, an Integrated Development Environment (IDE) or a basic text editor.

Developers often switch from interacting with a content object in the first context to interacting with the same object in the second context. For example, a developer navigates to a publicly available web site that he has created. After reviewing the site, he decides to make some changes. In order to edit the web site, however, he must first switch to the second context. The developer launches a new application and then navigates within the application to find the page that he wishes to edit. From start to finish, this context switch often requires a great deal of time and thought.

What is needed is a way to streamline the context-switch process so that it takes less time and/or less thought.

SUMMARY OF THE INVENTION

The present invention overcomes the limitations of the prior art by providing a mechanism for efficiently switching between interacting with a content object in a first context and interacting with the same content object in a second context. Information from the first context is used when switching to the second context and vice versa, thereby decreasing the overhead associated with switching contexts.

In one embodiment, the content object is an HTML file. In this embodiment, the first context can be a user context, such as the web page that appears when the HTML file is loaded into a web browser, and the second context can be a developer/creator context, such as an application that enables someone to edit the HTML file. In one embodiment, where the user context and the developer/creator context both use web browsers, the context-switching mechanism is a specialized URL (a "context-switch URL"). When a web browser in a first context is directed to a context-switch URL, it switches to a second context.

In one embodiment, the context switch is implemented using a modified web server that extracts information from the context-switch URL and uses that information in the second context. This information comprises, for example, user authentication information, an account identifier, file location information, and a development mode. This information can be accessed, for example, in a cookie file, in a web browser plugin, or in a web browser itself.

In one embodiment, a person initiates a context-switch by pushing a button on a web browser. In one embodiment, this causes a context-switch URL to be generated and directs the web browser to the context-switch URL.

BRIEF DESCRIPTION OF THE DRAWINGS

FIG. 10F illustrates an exemplary email generated by the system using the collaborate user interface.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE EMBODIMENTS

As discussed above, switching from interacting with a content object in a first context to interacting with the same content object in a second context often requires a great deal of time and thought. In one embodiment, this process is streamlined by using a context-switching mechanism. In one embodiment, this mechanism provides information from a first context to a second context and vice versa. This information can then be used in the destination context, thereby decreasing the overhead associated with switching contexts. This information can comprise, for example, user authentication information, an account identifier, file location information, and a development mode.

Figure 1:
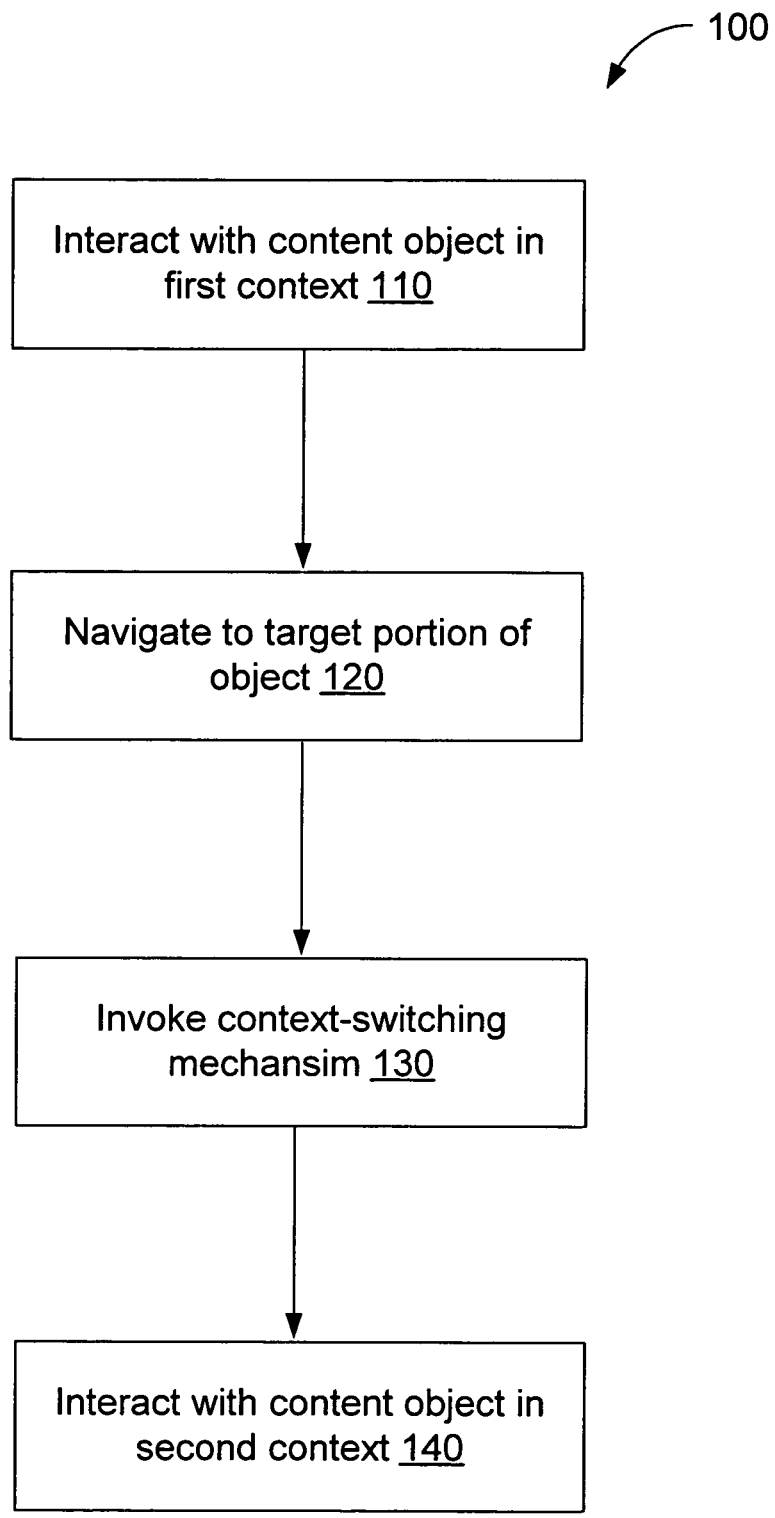
FIG. 1 illustrates a flowchart of a method for switching between a first context and a second context, according to one embodiment of the invention.

FIG. 1 illustrates a flowchart of a method for switching between a first context and a second context, according to one embodiment of the invention. In the illustrated example, the first context is a user context, and the second context is a developer/creator context. Method 100 begins when a developer interacts 110 with a content object in a user context. The developer then navigates 120 to the target portion of the object (e.g., the portion that he wants to edit). The developer invokes 130 the context-switching mechanism. The developer then interacts 140 with the same portion of the same object in the developer/creator context.

Figure 2:
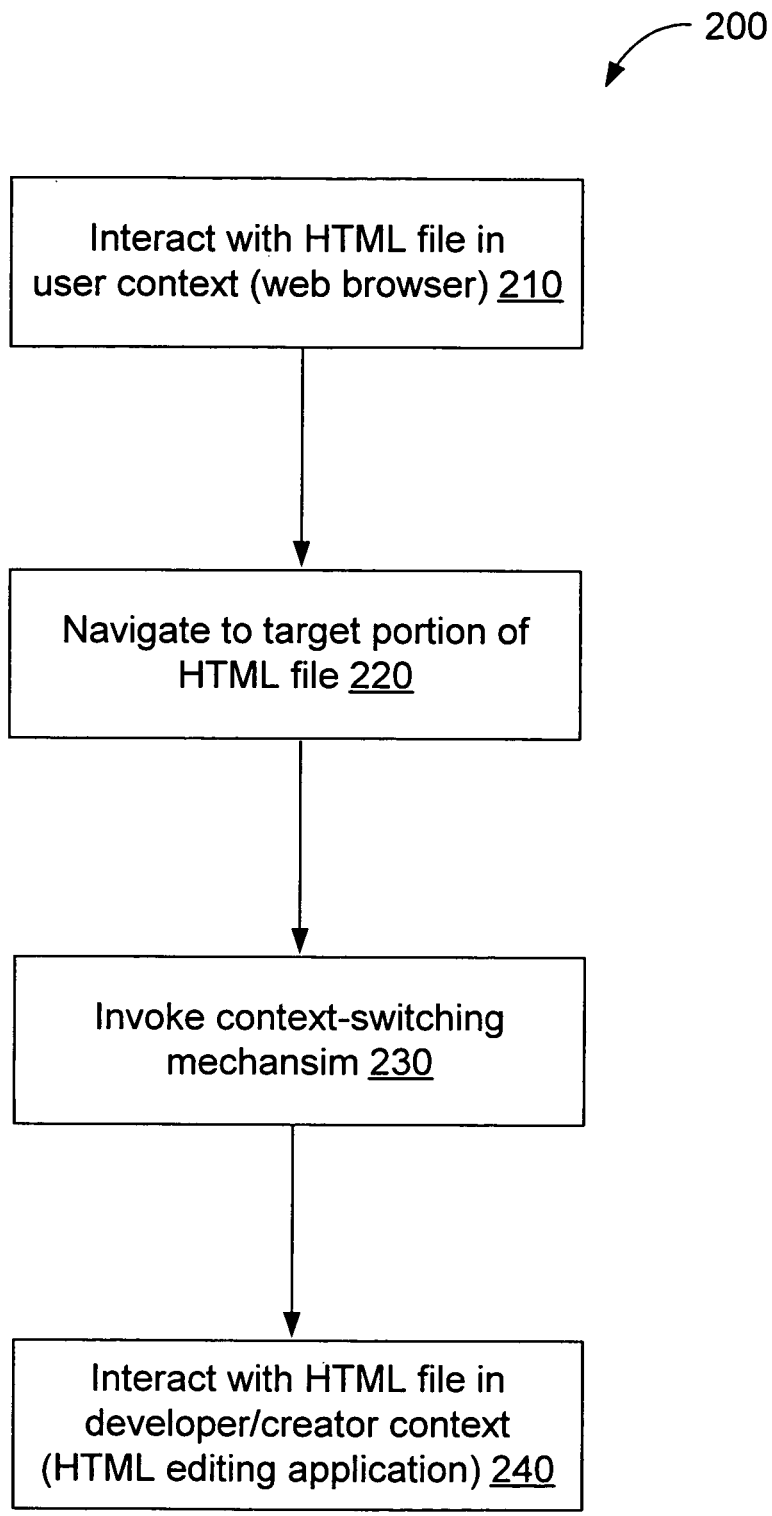
FIG. 2 illustrates a flowchart of a method for switching between a user context and a developer/creator context with respect to an HTML file, according to one embodiment of the invention.

FIG. 2 illustrates a flowchart of a method for switching between a user context and a developer/creator context with respect to an HTML file, according to one embodiment of the invention. Method 200 begins when a developer interacts 210 with an HTML file in a user context. For example, the developer views the HTML file in a web browser. The developer then navigates 220 to the target portion of the HTML file. For example, the developer scrolls to or selects a particular portion of the web page. The developer invokes 230 the context-switching mechanism. For example, the developer presses a button in the web browser. The developer then interacts 240 with the same portion of the same HTML file in the developer/creator context. For example, an HTML editing application is launched that displays the same portion of the HTML file that was being displayed in the web browser.

Figure 3:
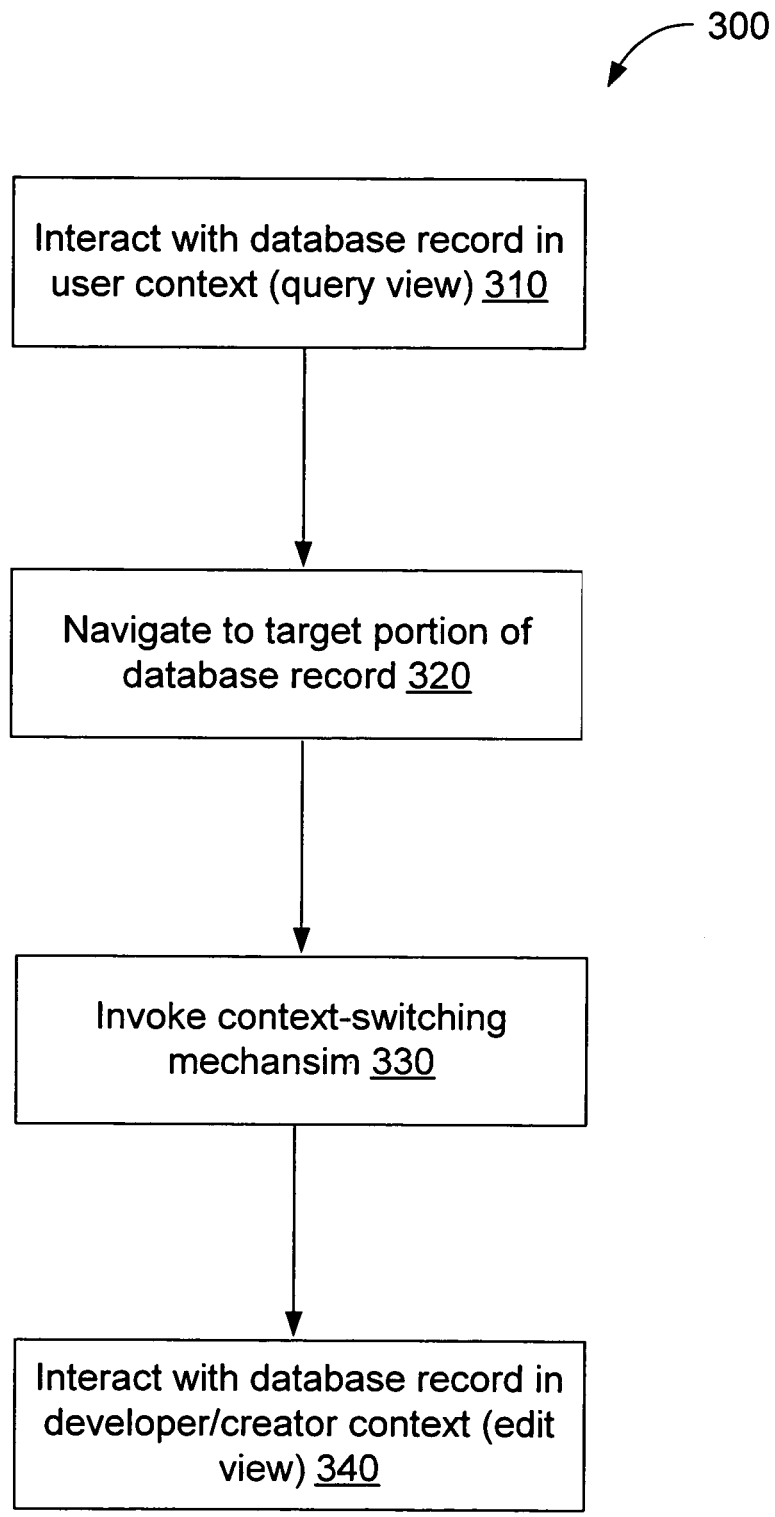
FIG. 3 illustrates a flowchart of a method for switching between a user context and a developer/creator context with respect to a database, according to one embodiment of the invention.

FIG. 3 illustrates a flowchart of a method for switching between a user context and a developer/creator context with respect to a database, according to one embodiment of the invention. Method 300 begins when a developer interacts 310 with a database in a user context. For example, the developer queries the database, resulting in a database record in query mode. The developer then navigates 320 to the target portion of the database record. For example, the developer tabs to or selects a particular field of the database record. The developer invokes 330 the context-switching mechanism. For example, the developer presses a button in the query dialog. The developer then interacts 340 with the same portion of the same database record in the developer/creator context. For example, the same database record is shown in edit mode, and the same field is selected.

1. Architecture of Web Publishing System Including Context-Switching Mechanism

For simplicity purposes and ease of understanding, the preferred embodiment of the present invention will be described primarily in the context of the web page example from FIG. 2. However, those skilled in the art will recognize that similar technologies and explanations would apply to other contexts, such as those involving database records (FIG. 3) and any other types of content objects beyond those described with reference to FIGS. 1-3.

a. General Architecture

Figure 4A:
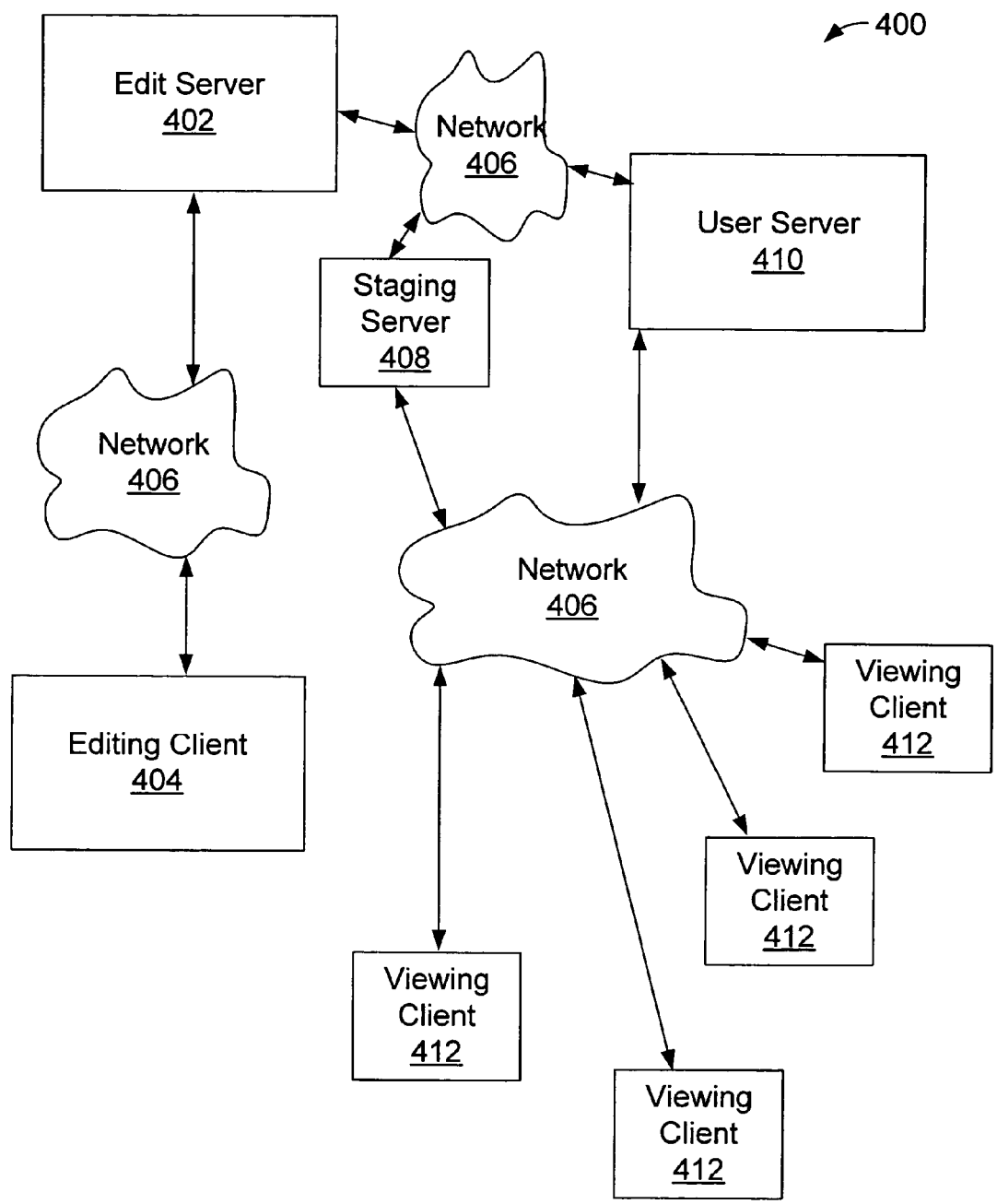
FIG. 4A is a block diagram of a content management system that includes a context-switching mechanism, according to one embodiment of the invention.

FIG. 4A is a block diagram of a content management system that includes a context-switching mechanism, according to one embodiment of the invention. In the illustrated embodiment, content management system (CMS) 400 comprises edit server 402, editing client 404, staging server 408, user server 410, and one or more viewing clients 412. Edit server 402, editing client 404, staging server 408, user server 410, and one or more viewing clients 412 are connected via one or more networks 406. In one embodiment, network 406 is a public network, such as the Internet. In another embodiment, network 406 is a private IP-based Local Area Network (LAN) or Wide Area Network (WAN). The communication links to and from network 406 can be wireline or wireless (i.e., terrestrial- or satellite-based transceivers).

A web site comprises, for example, template data, content data, and software and/or hardware instructions. Edit server 402 stores a "working copy" of a web site and makes this web site available to authorized users. The web site is not available to the public for general viewing. Edit server 402 can be one server computer unit or distributed over multiple computers. The edit server 402 includes a modified web server as will be described below.

An authorized user interacts with edit server 402 via editing client 404. Editing client 404 enables a user to create, edit, and maintain a web site that is stored on edit server 402. Edit server 402 sends information to and receives information from editing client 404. Editing client 404 may be, for example, a general-purpose computer with a web browser. In this embodiment, information sent to editing client 404 is interpreted and displayed on a web browser. Editing client 404 is connected to edit server 402 via network 406.

In one embodiment, editing client 404 can display a target web page in one of five modes: Edit, Preview, History, Collaborate, and Design. In Edit mode, editing client 404 displays the target web page in a ready-for-editing format. In Preview mode, editing client 404 displays the target web page as it would appear to a user. In History mode, editing client 404 displays the history of the target web page within CMS 400, including, for example, information regarding past edits of the page. In Collaborate mode, editing client 404 displays a text editor that enables a user to draft an email that automatically links to the target web page within CMS 400. In Design mode, the editing client 404 displays the target web page in a ready-for-design format with buttons, tools, frames, and other features routinely used in the design stage. For example, a frame provided to show the file hierarchy for designer navigation, or a template editor for editing templates.

After a web site is edited, it can be staged. Staging is an optional step between editing a web site and publishing it. Staging server 408 stores a web site and enables an authorized user to preview it after it has been edited and before it has been sent to user server 410 for general use. Staging server 408 can be a separate physical server, part of user server 410, or part of edit server 402. Staging server 408 can also be one server unit or distributed over multiple computers.

User server 410 stores a web site and makes it available to the public for general viewing. One or more viewing clients 412 can be connected to user server 410 via network 406. A viewing client 412 can be, for example, a general-purpose computer with a web browser.

User server 410 can receive web site information from edit server 402. In an alternate embodiment, the user server 410 receives web site information from either edit server 402 or staging server 408. This information can comprise a single web page, multiple pages, all pages that have been updated, or an entire web site. User server 410 is preferably a separate physical server but may be a part of edit server 402. For example, edit server 402 with address http://center.atomz.com/ is preferably distinct from the staging server 408 with address http://content.atomz.com/ and typically used for testing. User server 410 can also be one server unit or distributed over multiple computers. User server 410 is connected to edit server 402 and/or staging server 408 via network 406. Like the edit server 402, the user server 410 includes a modified web server as will be described below.

Figure 4B:
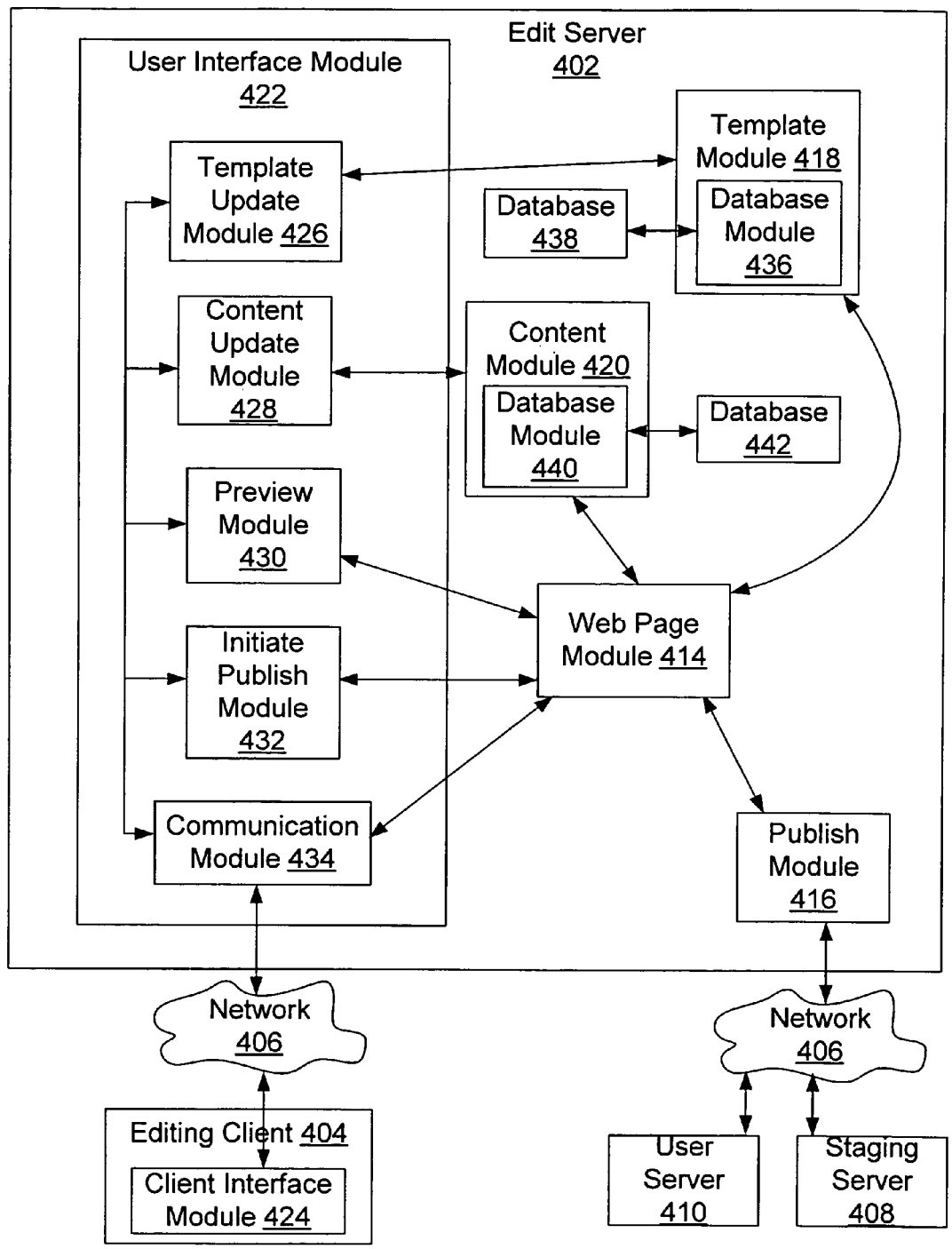
FIG. 4B is a block diagram showing more detail of the edit server and the editing client of the content management system shown in FIG. 4A, according to one embodiment of the invention.

FIG. 4B is a block diagram showing more detail of the edit server and the editing client of the content management system shown in FIG. 4A, according to one embodiment of the invention. Edit server 402 includes user interface module 422, web page module 414, publish module 416, template module 418, and content module 420. Editing client 404 includes client interface module 424. Modules 414, 416, 418, 420, 422, and 424 can be implemented in software, hardware, or firmware.

User interface module 422 provides a user interface to a user via client interface module 424 on editing client 404. User interface module 422 includes template update module 426, content update module 428, preview module 430, initiate publish module 432, and communication module 434. In one embodiment, client interface module 424 is a web browser. Communication module 434 sends HTML data to client interface module 424. The HTML data is interpreted and displayed by client interface module 424 to provide a user interface for the user. This user interface provides information to the user and enables the user to enter and send information to edit server 402.

Template module 418 includes database module 436, which is connected to database 438. Content module 420 includes database module 440, which is connected to database 442. While databases 438 and 442 are shown as being within edit server 402, databases 438 and 442 may also be located elsewhere.

The user enters information defining or editing templates into client interface module 424 of editing client 404. Client interface module 424 displays a field into which the user can enter HTML code that defines the template. After the user enters the code, client interface module 424 sends the code to communication module 434 via network 406. Communication module 434 directs the code to template update module 426, which in turn sends the code to template module 418. Template module 418 manages the templates in database 438 via database module 436. If the received template is a new template, template module 418 stores the code in database 438 via database module 436. If the received template is an edited version of a template that already exists, template module 418 updates the template stored in database 438 via database module 436.

The user also enters information defining or editing web page content into client interface module 424. Client interface module 424 displays a field into which the user can enter the content. After the user enters the content, client interface module 424 sends the content to communication module 434 via network 406. Communication module 434 directs the content to content update module 428, which in turn sends the content to content module 420. Content module 420 manages the content files in database 442 via database module 440. If the received content is an edited version of existing content, content module 420 updates the existing content in database 442 via database module 440.

When the user desires to preview a web page while using editing client 404, the user sends a request to user interface module 422 via client interface module 424 and network 406. User interface module 422 receives the request at communication module 434, which sends the request to preview module 430. Preview module 430 then sends a request to web page module 414. Web page module 414 is a type of document module that handles web page documents. In other embodiments with other document types, web page module 414 may be replaced with a document module specific to the type of document used. Web page module 414 retrieves the web page from cache or generates the web page by combining a template from template module 418 and content from content module 420 and delivers the web page to preview module 430, which sends the web page to communication module 434, which in turn passes the web page to client interface module 424 for the user to preview.

When the user desires to view the current version of the web site on either staging server 408 or user server 410, the user sends a request to user interface module 422 via client interface module 424 and network 406. User interface module 422 receives the request at communication module 434, which sends the request to initiate publish module 432. Initiate publish module 432 then sends the request to web page module 414. Web page module 414 delivers the web page to publish module 416, which in turn passes the web page to either staging server 408 or user server 410, depending on the user's request.

To deliver a web page to preview module 430 or publish module 416, the web page module 414 combines a template from template module 418 and content from content module 420. Alternatively, the template and content are retrieved from cache. When a template and content are merged to form a web page, that web page is cached. If neither the template nor the content has been changed since the last time the template and content were merged to form the web page, the merged web page is retrieved from cache instead of combined again. In the preferred embodiment, the web page module 414 does not have the administrative burden of tracking cache validity but it happens automatically when the cache is invalidated upon modification of content or a template. The web page module 414 first tries to retrieve the web page may be from cache, but if it is not there or the cache is invalid, the web page module 414 retrieves it from the template module 418 and content module 420.

Typically, the template and content each contain Uniform Resource Locators (URLs). The web page that web page module 414 forms from the combination of the template and content may also contain URLs. The web page may be at a different location than the template and content. In order for the URLs in the web page to function correctly, web page module 414 modifies or rewrites the URLs in the web page. The manner in which URLs are modified depends on the server upon which the web page will be stored, and thus the address for the webpage whether it be the content module 420, user server 410, or staging server 408. After combining the template and content, web page module 414 sends the web page with modified URLs to publish module 416, to be sent to user server 410 or staging server 408, or to preview module 430, to be sent to client interface module 424.

b. Context-Switching Mechanism

As discussed above, editing client 404 is used to edit a web page that exists on edit server 402, and viewing client 412 is used to view a web page that exists on user server 410. In system 400, then, the user context is using viewing client 412 to view a web page that exists on user server 410, while the developer/creator context is using editing client 404 to edit a web page that exists on edit server 402.

System 400 includes a context-switching mechanism for switching between the user context and the developer/creator context. In one embodiment, viewing client 412 and editing client 404 are general-purpose computers with web browsers, and this context-switching mechanism is a "context-switch URL." For example, a person uses a web browser (viewing client 412) to view a particular web page (the "target" web page). The person then directs the web browser to a context-switch URL. As a result, the browser switches contexts so that it is used as editing client 404. In other words, the browser will display the target web page in the developer/creator context.

Similarly, a person uses a web browser (editing client 404) to edit a particular web page and load it onto user server 410. The person then directs the web browser to a context-switch URL. As a result, the browser switches contexts so that it is used as viewing client 412. In other words, the browser will display the target web page in the user context, thereby enabling the person to view the modified web page.

In one embodiment, a context-switch is accomplished using a modified web server. When the modified web server receives an HTTP request for a context-switch URL, the HTTP response that it sends contains information in the destination context, rather than information in the origination context. The modified web server will be further discussed below with reference to FIGS. 5 and 6.

Figure 7:
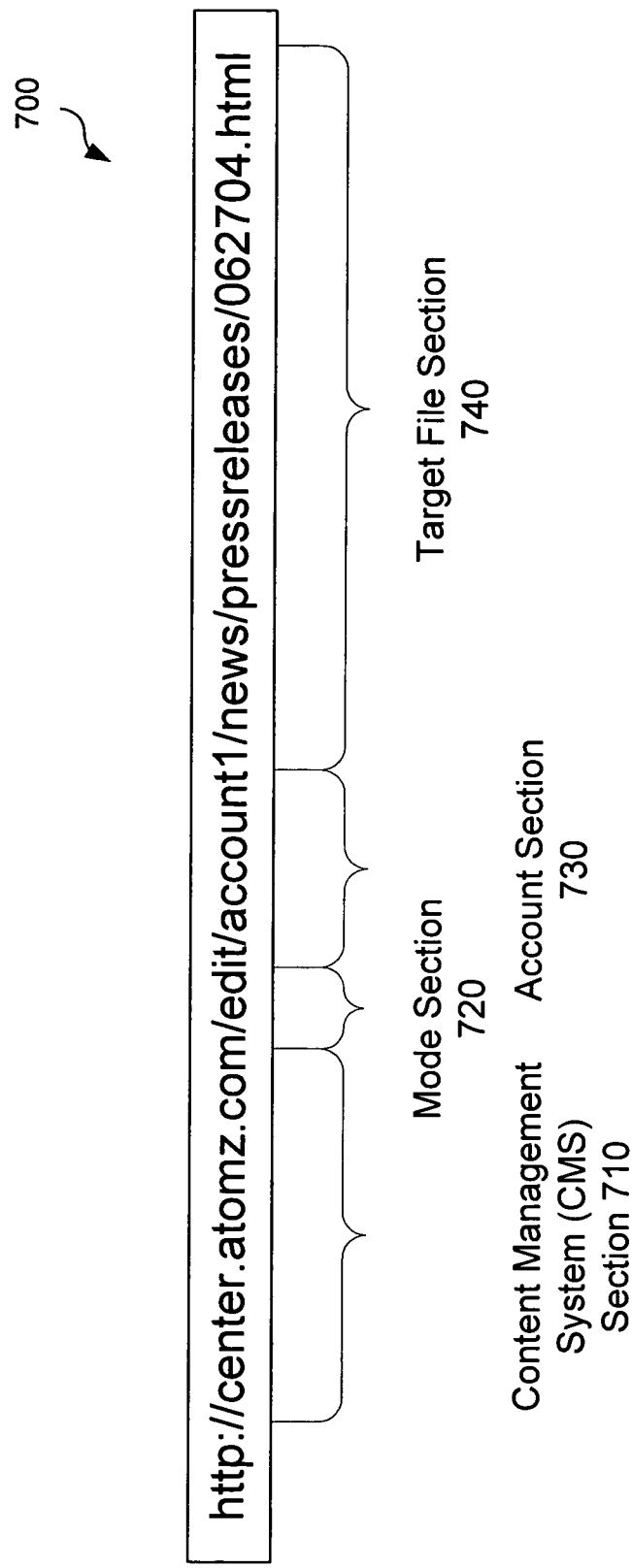
FIG. 7 illustrates a diagram of a "context-switch URL", according to one embodiment of the invention.

FIG. 7 illustrates a diagram of a "context-switch URL", according to one embodiment of the invention. In the illustrated embodiment, a context-switch URL 700 is comprised of four sections: content management system (CMS) section 710, mode section 720, account section 730, and target file section 740.

CMS section 710 indicates the edit server 402 that manages the target web page. In one embodiment, the owner of the web page hosts the edit server 402. In another embodiment, the owner contracts with a third party to host the edit server 402.

Mode section 720 indicates in which mode the editing client 404 should be set. In one embodiment, possible modes include Edit, Preview, History, Collaborate and Design.

Account section 730 indicates an account with which the target web page is associated. In one embodiment, an edit server 402 that manages several web sites associates each web site (and its constituent pages) with an account.

Target file section 740 indicates the identity of the target file within the account indicated by account section 730. In one embodiment, an account may contain a logical hierarchy of web pages. This logical hierarchy may or may not correspond to the physical hierarchy (files, directories, etc.) within which the pages are stored.

2. Architecture of Modified Web Server

Figure 5:
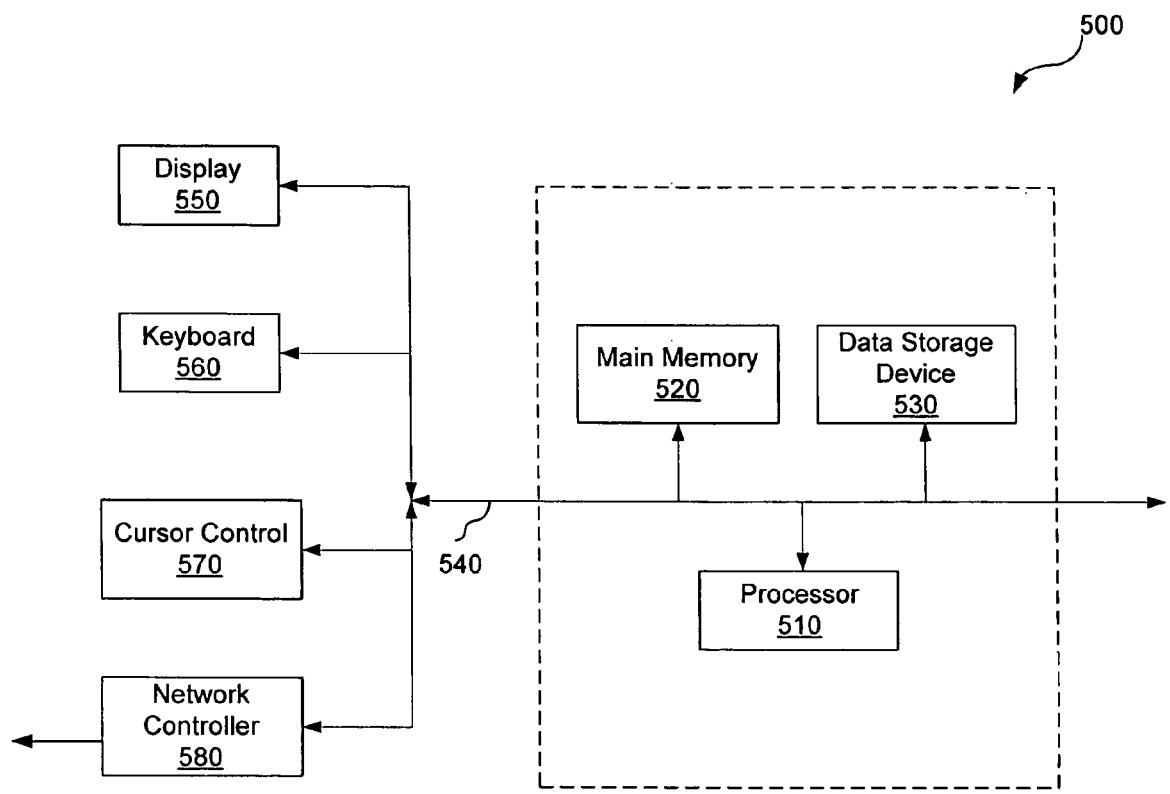
FIG. 5 is a block diagram of a web server for implementing the invention, according to one embodiment.

FIG. 5 is a block diagram of a web server for implementing the invention, according to one embodiment. Web server 500 preferably includes a processor 510, a main memory 520, a data storage device 530, and an input/output controller 580, all of which are communicatively coupled to a system bus 540. Web server 500 can be, for example, a general-purpose computer. In one embodiment, web server 500 is part of user server 410.

Processor 510 processes data signals and comprises various computing architectures including a complex instruction set computer (CISC) architecture, a reduced instruction set computer (RISC) architecture, or an architecture implementing a combination of instruction sets. Although only a single processor is shown in FIG. 5, multiple processors may be included.

Main memory 520 stores instructions and/or data that are executed by processor 510. The instructions and/or data comprise code for performing any and/or all of the techniques described herein. Main memory 520 is preferably a dynamic random access memory (DRAM) device, a static random access memory (SRAM) device, or some other memory device known in the art.

Data storage device 530 stores data and instructions for processor 510 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 580 links web server 500 to other devices so that web server 500 can communicate with these devices.

System bus 540 represents a shared bus for communicating information and data throughout web server 500. System bus 540 represents one or more buses including an industry standard architecture (ISA) bus, a peripheral component interconnect (PCI) bus, a universal serial bus (USB), or some other bus known in the art to provide similar functionality.

Additional components that may be coupled to web server 500 through system bus 540 include a display device 550, a keyboard 560, and a cursor control device 570. Display device 550 represents any device equipped to display electronic images and data to a local user or maintainer. Display device 550 is a cathode ray tube (CRT), a liquid crystal display (LCD), or any other similarly equipped display device, screen, or monitor. Keyboard 560 represents an alphanumeric input device coupled to web server 500 to communicate information and command selections to processor 510. Cursor control device 570 represents a user input device equipped to communicate positional data as well as command selections to processor 510. Cursor control device 570 includes a mouse, a trackball, a stylus, a pen, cursor direction keys, or other mechanisms to cause movement of a cursor.

It should be apparent to one skilled in the art that web server 500 includes more or fewer components than those shown in FIG. 5 without departing from the spirit and scope of the present invention. For example, web server 500 may include additional memory, such as, for example, a first or second level cache or one or more application specific integrated circuits (ASICs). As noted above, web server 500 may be comprised solely of ASICs. In addition, components may be coupled to web server 500 including, for example, image scanning devices, digital still or video cameras, or other devices that may or may not be equipped to capture and/or download electronic data to/from web server 500.

Figure 6:
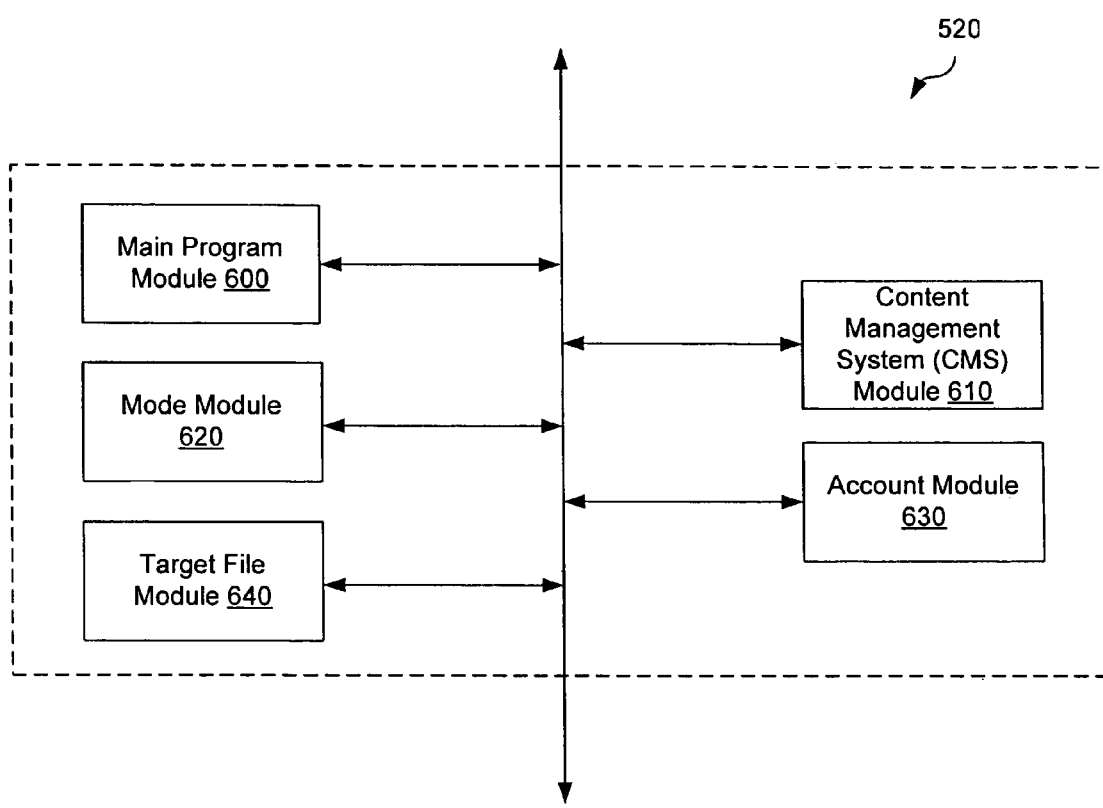
FIG. 6 illustrates a more detailed block diagram of the contents of the memory unit in FIG. 5, according to one embodiment of the invention.

FIG. 6 illustrates a more detailed block diagram of the contents of the memory unit in FIG. 5, according to one embodiment of the invention. Generally, memory unit 520 comprises several code modules for implementing a context-switch mechanism. Specifically, the code modules in memory unit 520 include a main program module 600, a CMS module 610, a mode module 620, an account module 630, and a target file module 640. Code modules 600, 610, 620, 630, and 640 are communicatively coupled to each other.

Main program module 600 parses a context-switch URL and determines a corresponding developer/creator context. Main program module 600 transmits instructions and data to as well as receives data from each code module 610, 620, 630, and 640. The function of main program module 600 will be further described with reference to FIG. 8.

CMS module 610 determines, based on a given CMS section 710 of a context-switch URL 700, the identity of the edit server 402 that manages the target web page. In one embodiment, the text of CMS section 710 comprises the desired domain name. In another embodiment, the text of CMS section 710 is used to determine the desired domain name, for example, by being used as a key in a look-up table.

Mode module 620 determines, based on a given mode section 720 of a context-switch URL 700, in which mode the editing client 404 should be set. In one embodiment, the text of mode section 720 comprises the desired mode. In another embodiment, the text of mode section 720 is used to determine the desired mode, for example, by being used as a key in a look-up table.

Account module 630 determines, based on a given account section 730 of a context-switch URL 700, the identity of the account with which the target web page is associated. In one embodiment, the text of account section 730 comprises the desired account. In another embodiment, the text of account section 730 is used to determine the desired account, for example, by being used as a key in a look-up table.

Target file module 640 determines, based on a given target file section 740 of a context-switch URL 700, the identity of the target file within the account indicated by account section 730. In one embodiment, the text of target file section 740 comprises the location of the target file within edit server 402's directory structure. In another embodiment, the text of target file section 740 is used to determine the location of the target file, for example, by being used as a key in a look-up table.

3. Methods

Figure 8:
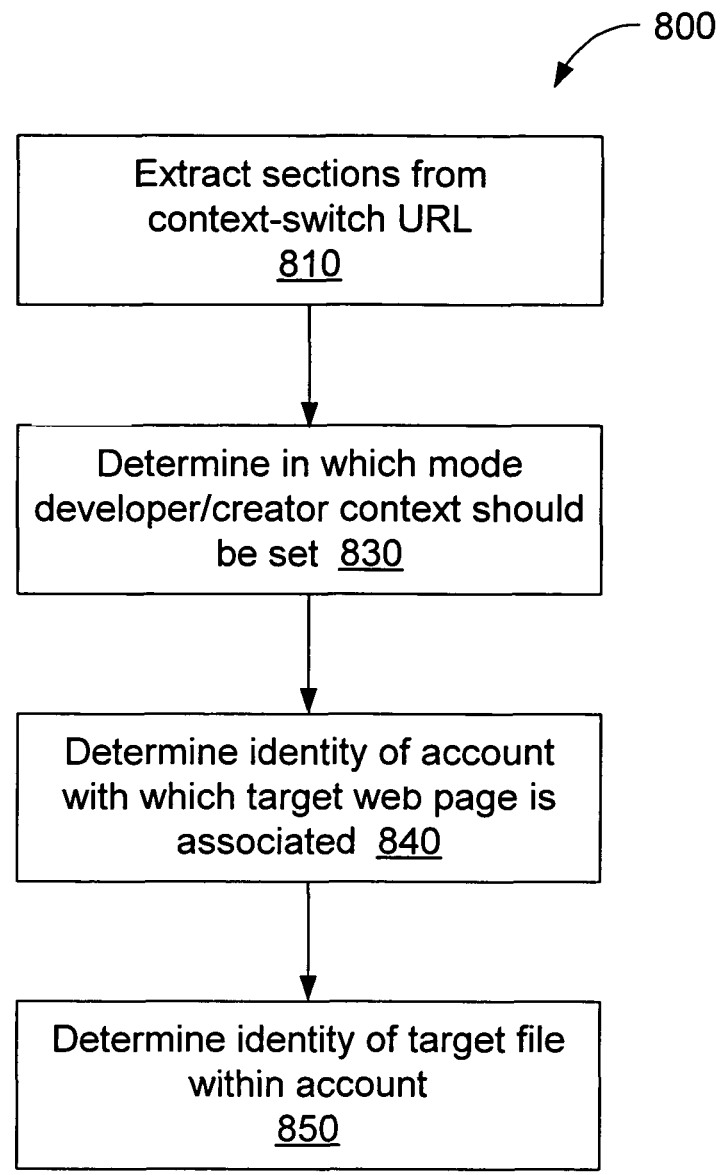
FIG. 8 illustrates a flowchart of a method performed by a web server, according to one embodiment of the invention.

FIG. 8 illustrates a flowchart of a method performed by a web server, according to one embodiment of the invention. In one embodiment, method 800 begins after a person has directed viewing client 412 to a context-switch URL 700. An HTTP request for the context-switch URL 700 is generated by viewing client 412 and received by web server 500. More particularly, the CMS section 710 is the address (either directly used or translated by the domain name server) to which the HTTP request is sent with the remaining portions of the context-switch URL 700 being part of the HTTP request. It should be understood that both the edit server 402 and the user server 412 include modified web servers as has been described above.

Main program module 600 extracts 810 the mode section 720, the account section 730, and the target file section 740 from context-switch URL 700 (e.g., by parsing the URL). In another embodiment, rather than all sections being extracted at once, each section is extracted at the time when it is needed. Main program module 600 instructs mode module 620 to determine 830, based on mode section 720, in which mode the editing client 404 should be set.

Main program module 600 instructs account module 630 to determine 840, based on account section 730, the identity of the account with which the target web page is associated. Main program module 600 instructs target file module 640 to determine 850, based on target file section 740, the identity of the target file within the account indicated by account section 730.

After method 800 has ended, the person is switched from the first context to the second context. In one embodiment, web server 500 sends an HTTP response to the person's browser that makes the person's browser become editing client 404. In one embodiment, the HTTP response comprises a web page that displays the target web page in the desired mode.

4. User Scenarios

As discussed above, method 800 begins after a person has directed viewing client 412 to a context-switch URL 700. In one embodiment, the person inputs context-switch URL 700 into viewing client 412. In another embodiment, context-switch URL 700 is generated without requiring any information from the person. For example, the person clicks on a button in viewing client 412. Clicking on the button causes context-switch URL 700 to be generated and directs viewing client 412 to context-switch URL 700. In another embodiment, rather than clicking on a button, a person chooses an option from a pull-down menu or otherwise somehow indicates a context-switching mechanism. As another example, when a person creates an email using viewing client 412, context-switch URL 700 is generated and appended to the email. For example, the user in the viewing client 412 clicks the Collaborate button, switches to editing client 404, and inputs an email message that is submitted to Edit Server 402. The Edit Server 402 generates and appends a context-switch URL 700 to the email and sends the email to the addressees. Thereafter, a user in the viewing client 412 receives the email message that contains a link (the appended URL 700), and the user clicks the link and context switches from the email client (Outlook, Eudora, etc.) into Editing client 404.

In one embodiment, context-switch URL 700 comprises CMS section 710, mode section 720, account section 730, and target file section 740. The information to be placed in these sections can come from a variety of sources. In one embodiment, the information comes from viewing client 412. For example, a javascript program determines the URL of the page currently shown in the browser. This information is then used for target file section 740. In another embodiment, information comes from the same machine as viewing client 412. For example, information is stored in a file such as a "cookie."

Figure 9:
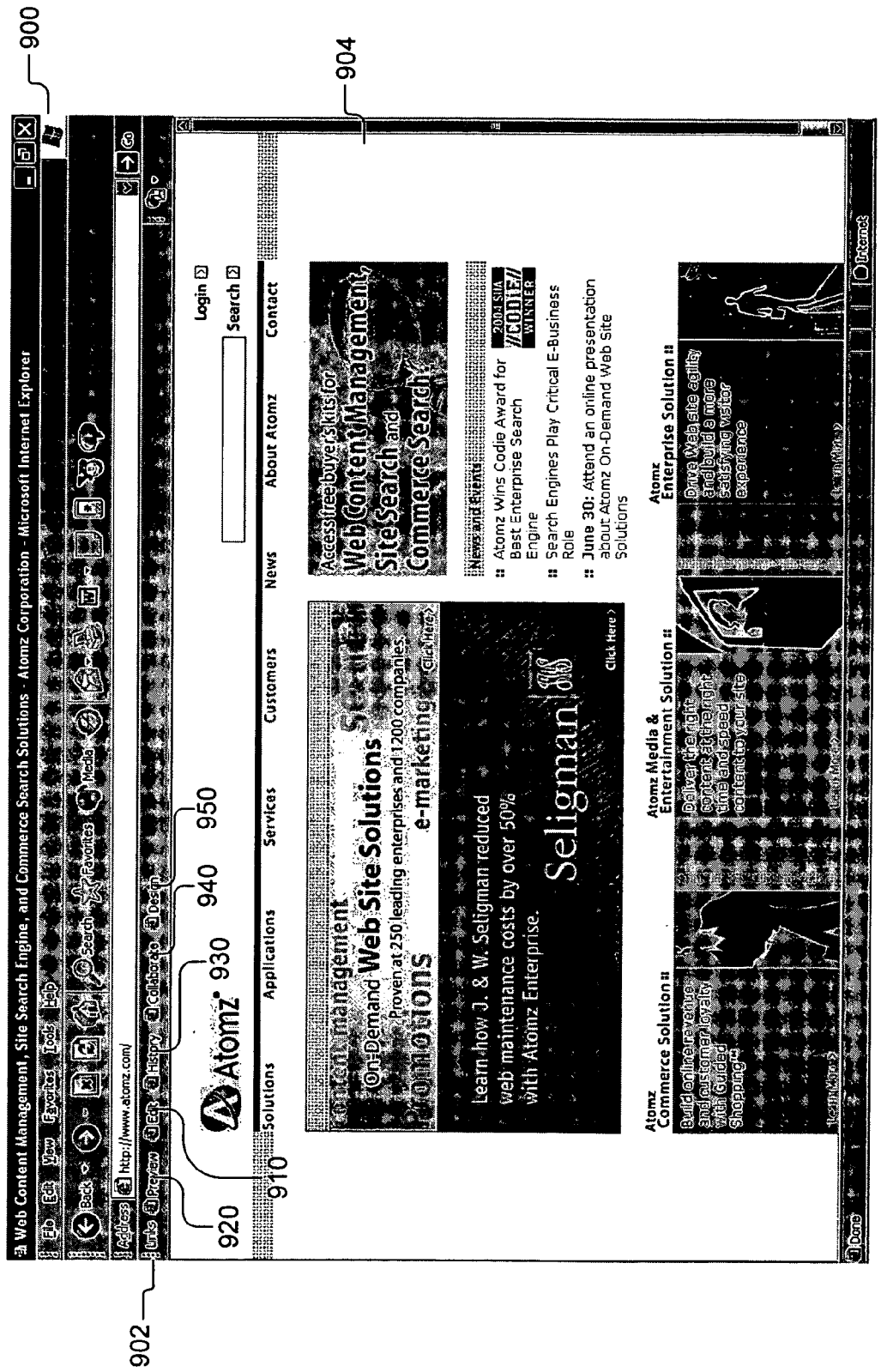
FIG. 9 illustrates a user interface showing multiple buttons that can be used to switch contexts, according to one embodiment of the invention.

In yet another embodiment, information comes from a button or other user interface feature. For example, a button may be programmed to specify Edit mode. In this embodiment, viewing client 412 can have several buttons, one for each mode. FIG. 9 illustrates a user interface showing multiple buttons that can be used to switch contexts, according to one embodiment of the invention. Specifically, FIG. 9 illustrates the user interface a person would see when he is interacting 210 with an HTML file in the user context and has navigated 220 to the target portion of the HTML file. User interface 900 of viewing client 412 (such as that of a web browser) includes an edit button 910, a preview button 920, a history button 930, a collaborate button 940, and a design button 950 all in a links bar 902. Within frame 904, the user interface shows the HTML file as rendered by a conventional browser. Invoking 230 a context-switch mechanism by clicking one of the buttons 910, 920, 930, 940, and 950 switches the context to the editing client 404. The person is thereafter interacting 240 with the HTML file in one of the developer/creator contexts as will be described below with reference to FIGS. 10A-10G. Editing client 404 displays the target file in the desired mode, depending on which button was clicked. (Recall that the target file is the file that was being shown in viewing client 412 when the button was clicked.)

In one embodiment, the button is installed as a plugin to the web browser. In another embodiment, the button is a link that has been imported (e.g., dragged) into the web browser. In one embodiment, edit server 402 generates the link and makes it available in editing client 404. For example, the CMS 610 dynamically builds a programs such as in javascript for each of the "modes" and inside of each program it includes the hostname, the user account number, and the mode. The user can then drag the link from editing client 404 to viewing client 412.

A. One-Click Editing

Figure 10A:
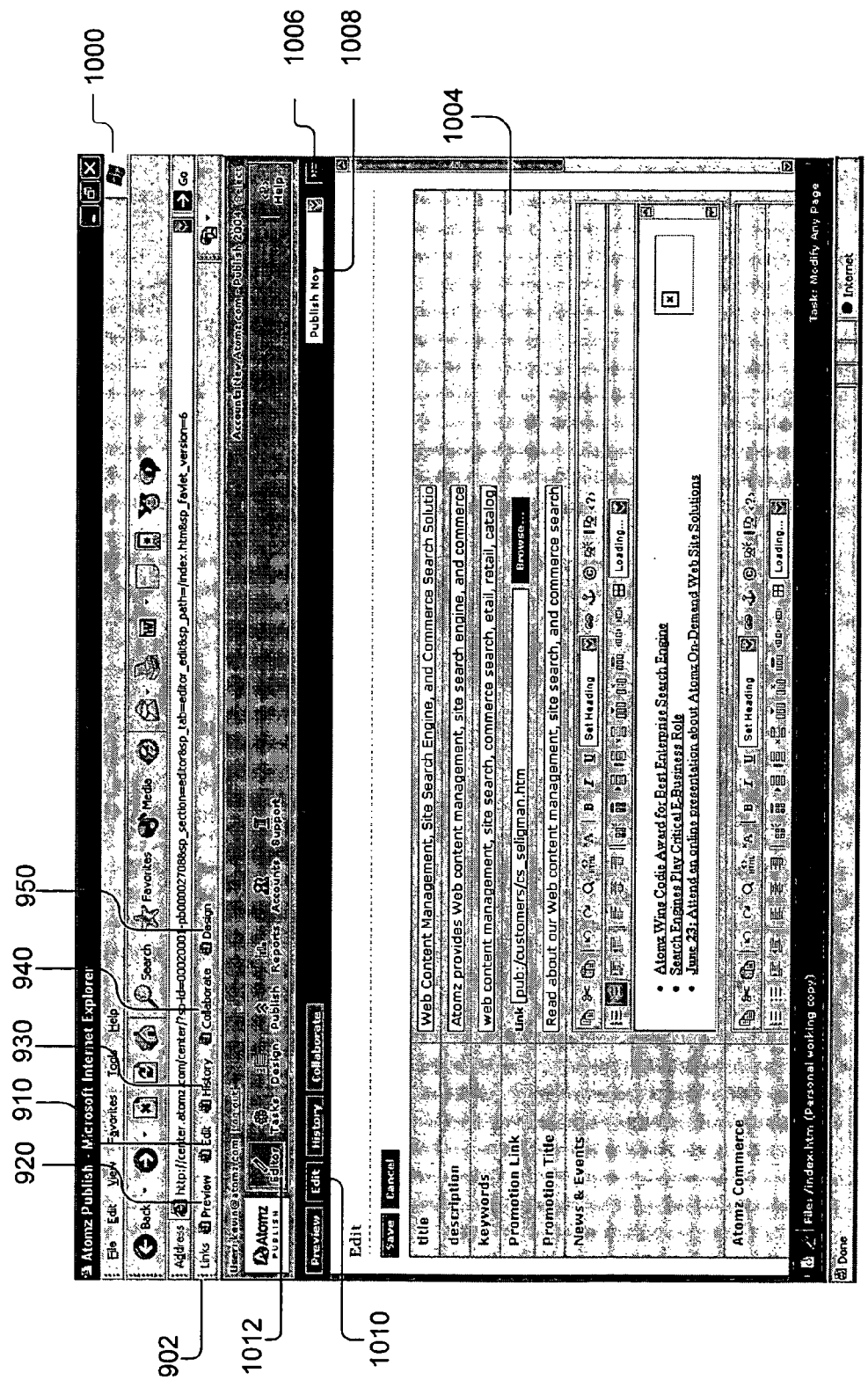
FIG. 10A illustrates a user interface after the context has been switched by choosing "Edit" in FIG. 9.

FIG. 10A illustrates a user interface after the context has been switched by choosing "Edit" in FIG. 9. FIG. 10A shows the user interface 1000 for an editing context which is one of the developer/creator contexts. For FIG. 10A, as well as FIGS. 10B-E, 10 like reference numerals have been used for similar portions of each user interface that provide similar or identical functionality. The user interface 1000 in one embodiment includes the context-switch mechanism (the plurality of buttons 910, 920, 930, 940, and 950 in a link tool bar 902). However, the editing user interface 1000 is unique in a number of respects. First, a frame 1004 displays and shows the editor in an editing state as shown by the content in the frame 1004. Second, an edit tab 1010 is shown in a visually distinct manner. Third, an editor button 1012 of the developer/creator context is shown in a visually distinct manner.

B. One-Click Publishing

One key advantage over the prior art is also provided by the editing user interface 1000. Still referring to FIG. 10A and in one embodiment, the editing user interface 1000 also includes a publishing pull-down menu 1008 and an "initiate" button 1006. The pull-down menu 1008 provides various alternatives of when to publish changes that have been entered into the CMS system 610 by the user with the editing user interface 1000. Such options include publish now, stage now, publish at a predetermined date, publish with next version, etc., and the pull-down menu 1008 is preferably set to a default action the user is most likely to perform such as publish now.

Figure 11:
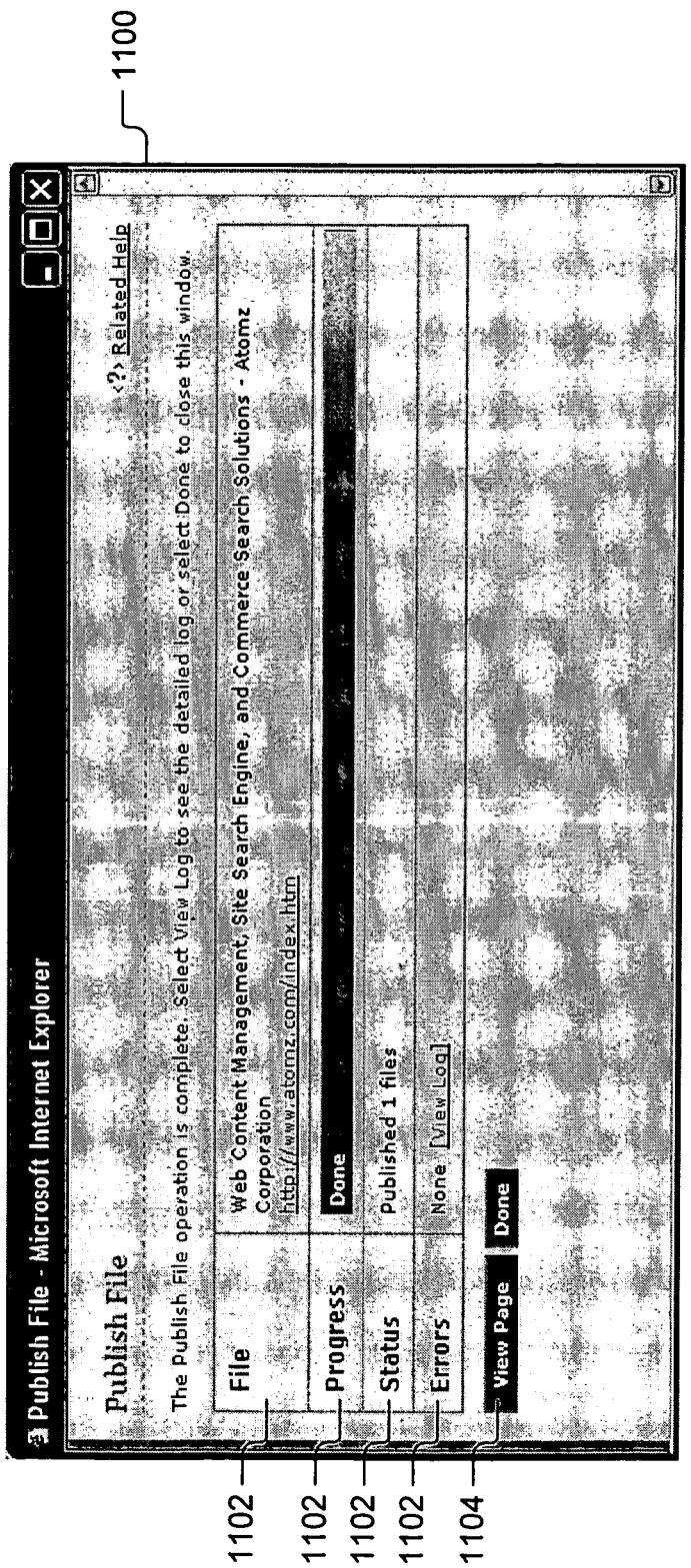
FIG. 11 is a graphical representation of a dialog box presented by the system during "one-click" publishing.

If the user selects the initiate button 1006, the changes being entered are published, and a new dialog box 1100 is presented such as that shown in FIG. 11. FIG. 11 illustrates a dialog box 1100 presented to the user as changes are published. The dialog box 1100 preferably includes a plurality of labels and corresponding files for reporting information such as the files being published, their status, the progress of publishing, and any errors. The dialog box 1100 also includes buttons 1104 to close the dialog box or return the user to a user context such as that displayed in FIG. 9.

Figure 12:
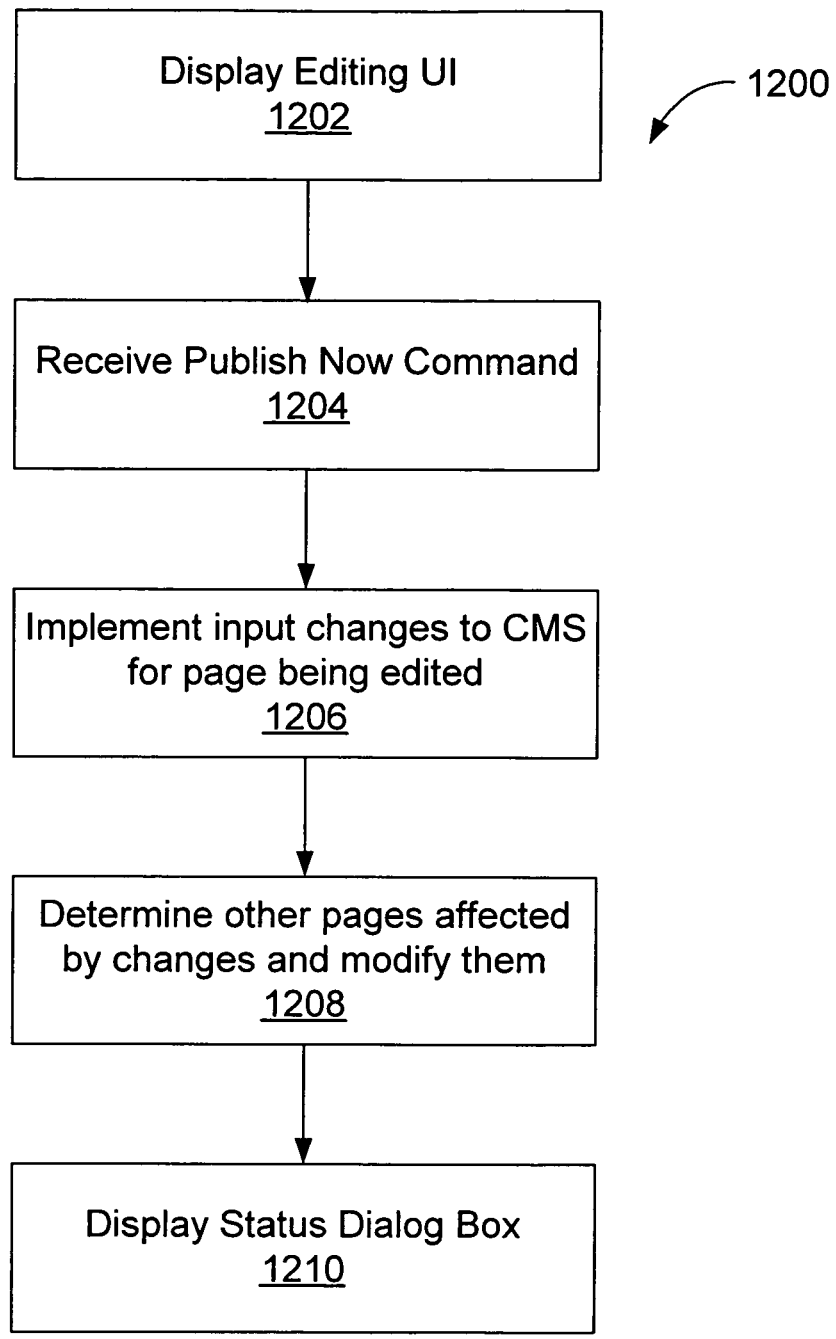
FIG. 12 is a flowchart of one embodiment of a method for performing one-click publishing.

Referring now also to FIG. 12, one embodiment of a method of performing one-click publishing includes the steps of: displaying 1202 an editing user interface 1000, receiving 1204 a publish now command from the user, implementing 1206 input changes to the CMS 610 for page being edited, determining 1208 other pages affected by changes and modifying them, and displaying 1210 a dialog box indicating the status of the publishing process.

C. Previewing

Figure 10B:
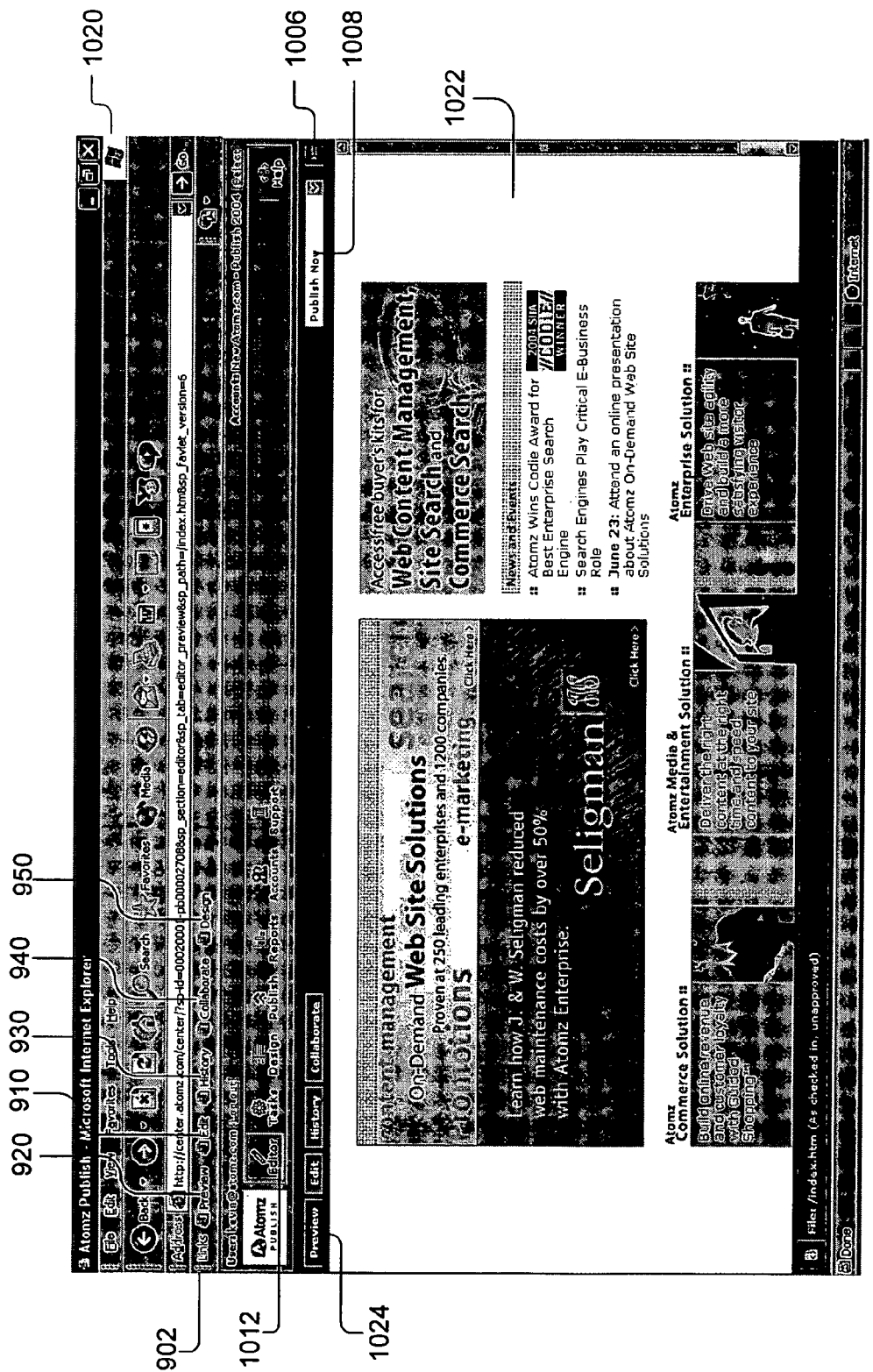
FIG. 10B illustrates a user interface after the context has been switched by choosing "Preview" in FIG. 9.

FIG. 10B illustrates a user interface 1020 after the context has been switched by choosing "Preview" in FIG. 9. FIG. 10B shows the user interface 1020 for a preview context which is one of the developer/creator contexts. The preview user interface 1020 in one embodiment includes the context-switch mechanism (the plurality of buttons 910, 920, 930, 940, and 950 in a link tool bar 902). However, the preview user interface 1020 is unique in a number of respects. First, a frame 1022 displays and shows the editor in an preview state as shown by the content in the frame 1022 being very similar as to how the actual web page will appear when published. Second, a preview tab 1024 is shown in a visually distinct manner. Third, the editor button 1012 of the developer/creator context is shown in a visually distinct manner.

D. History

Figure 10C:
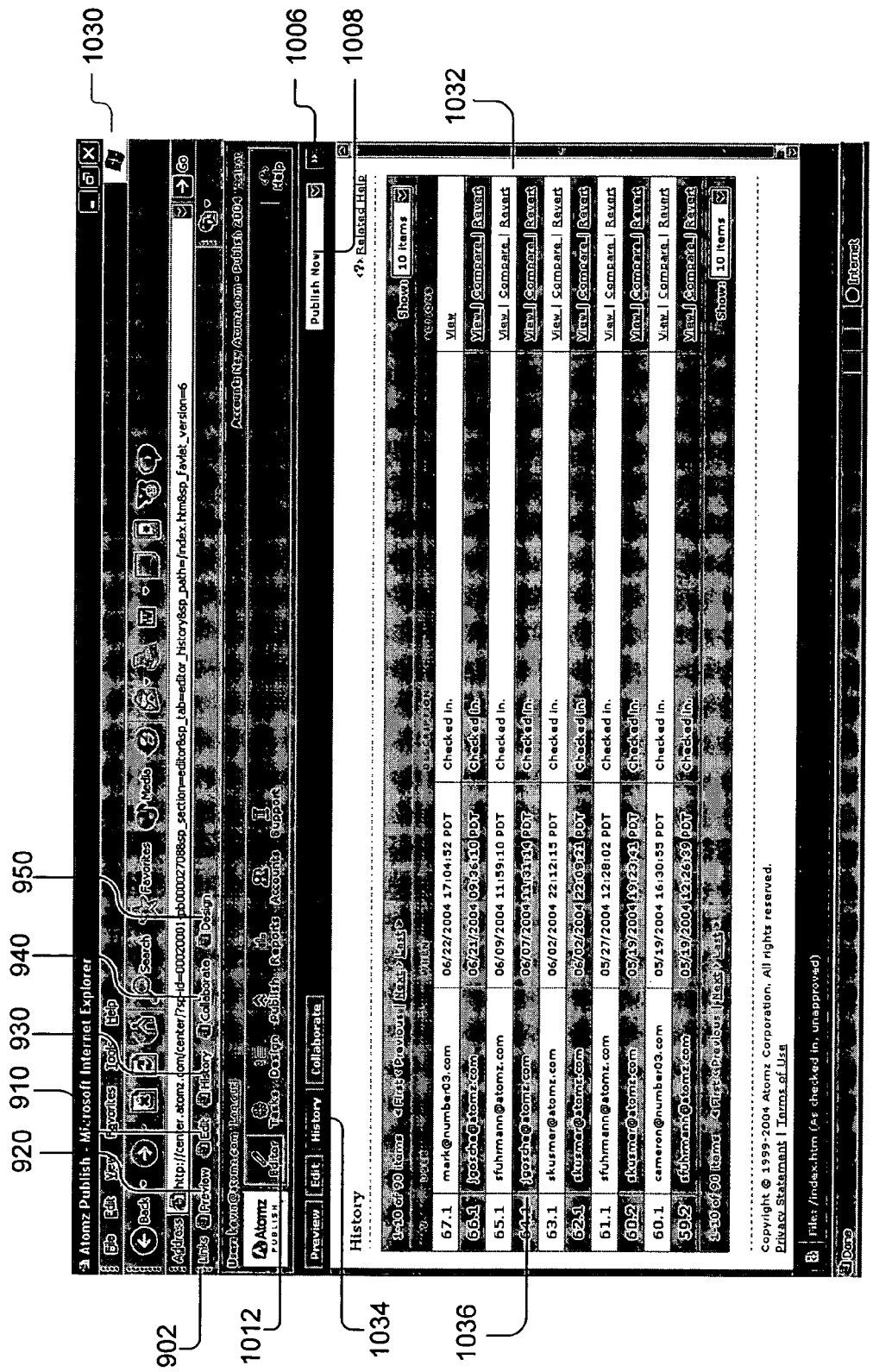
FIG. 10C illustrates a user interface after the context has been switched by choosing "History" in FIG. 9.

FIG. 10C illustrates a user interface after the context has been switched by choosing "History" in FIG. 9. FIG. 10C shows the user interface 1030 for a history context which is one of the developer/creator contexts. The history user interface 1030 in one embodiment includes the context-switch mechanism (the plurality of buttons 910, 920, 930, 940, and 950 in a link tool bar 902). However, the history user interface 1030 is different in a number of respects. First, a frame 1032 displays and shows a table 1036 of past modifications to the webpage including information on the user making the modification, when the modification was made, the current status of the modification, and other possible actions. Second, a history tab 1034 is shown in a visually distinct manner. Third, the editor button 1012 of the developer/creator context is shown in a visually distinct manner.

E. Collaborate

Figure 10D:
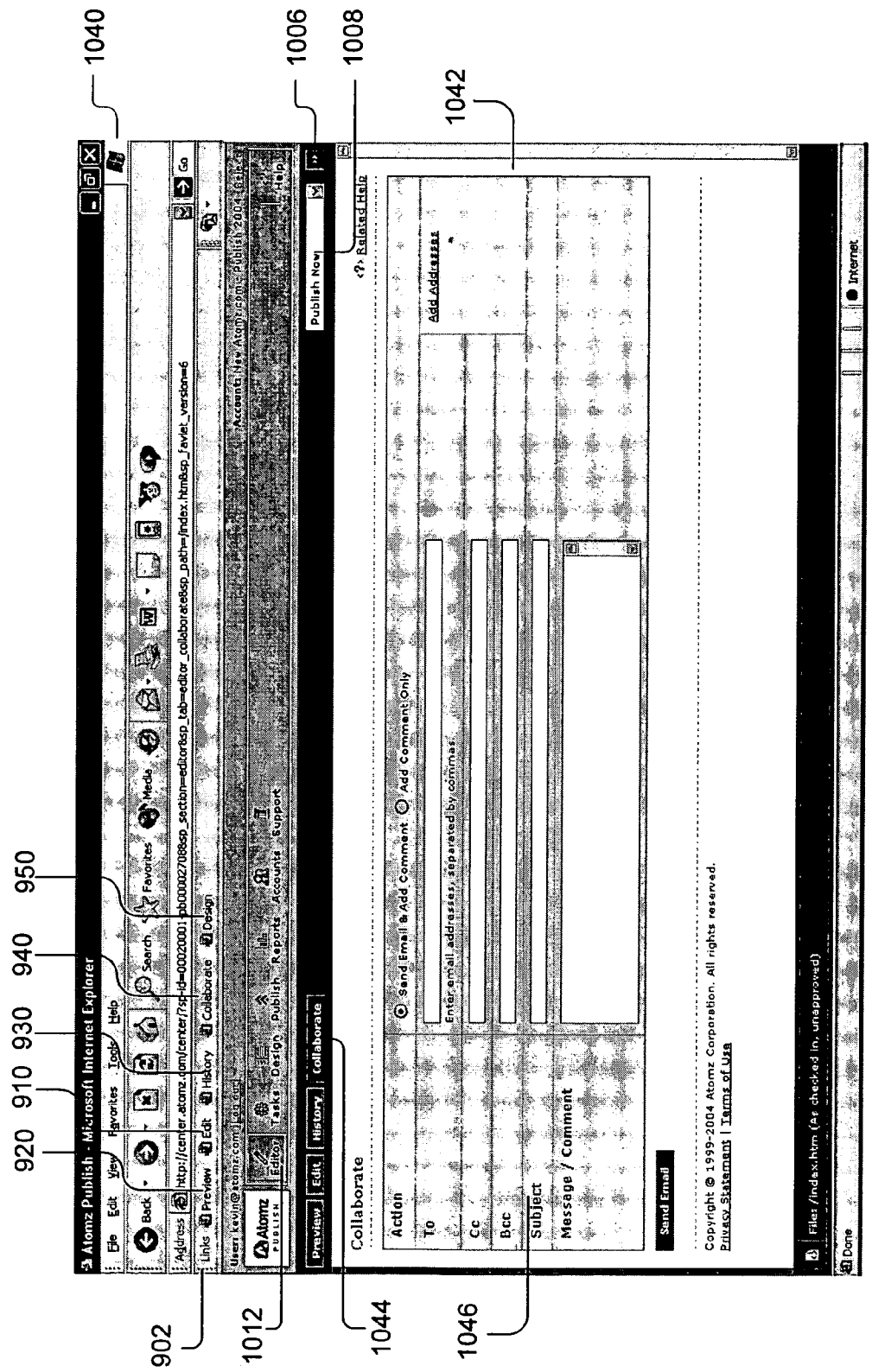
FIG. 10D illustrates a user interface after the context has been switched by choosing "Collaborate" in FIG. 9.

FIG. 10D illustrates a user interface after the context has been switched by choosing "Collaborate" in FIG. 9. FIG. 10D shows the user interface 1040 for a collaborate context which is one of the developer/creator contexts. The collaborate user interface 1040 in one embodiment includes the context-switch mechanism (the plurality of buttons 910, 920, 930, 940, and 950 in a link tool bar 902), and editor button 1012 of the developer/creator context is shown in a visually distinct manner. However, the collaborate user interface 1040 is different in a number of respects. First, a frame 1042 displays an email template 1046 to share information about the particular web page with others. Second, a collaborate tab 1044 is shown in a visually distinct manner to notify the user as to the mode in which he is operating.

F. Ad Hoc Workflow

Figure 10E:
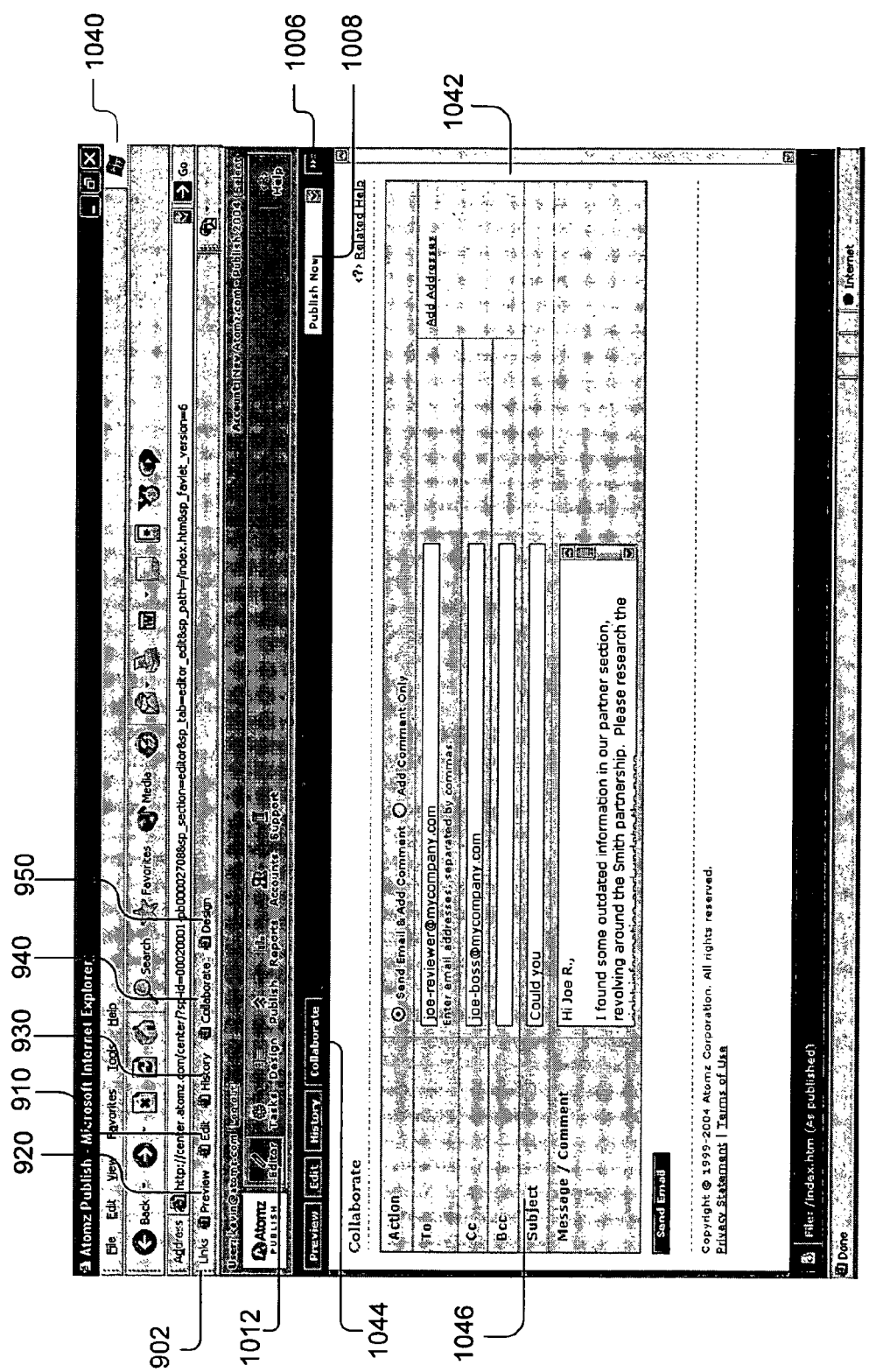
FIG. 10E illustrates a collaborate user interface after the user has input text.

Referring now also to FIG. 10E, the collaborate user interface 1040 is shown including data that has been input by the user. The collaborate user interface 1040 supports and enhances communication between team members, while providing historical tracking. Below is an example of how the collaborate user interface 1040 provides an ad hoc workflow capability to a content management system:

A manager visits a web site and notes that there is out-of-date information on the page. With one-click editing the manager logs in to the CMS and visits the editing user interface 1000 application for the page. By clicking on the "Collaborate" tab 1044, the manager is taken to the collaborate user interface 1040 where he or she can input an email to someone who should handle this page's changes such as illustrated in FIG. 10E. An email 1048 is generated by the system 610 and includes links 1050 to make it very simple to edit or review the page, both outside the content management system as well as within the content management system. FIG. 10F illustrates an exemplary email generated by the system using the collaborate user interface. The system 610 preferably includes all references to documents you are editing. The system 610 sends the email 1048 to the content owner. The contents of this email 1048 are kept within the system 610 to track intended and completed changes to the web site. It can be viewed by the History Tab 1034 which displays changes made to a page. Thus, through ad hoc workflow, content owners and their colleagues can directly communicate using email regarding updates to the web site, while the system 610 keeps track of the communications.

G. Design

Figure 10G:
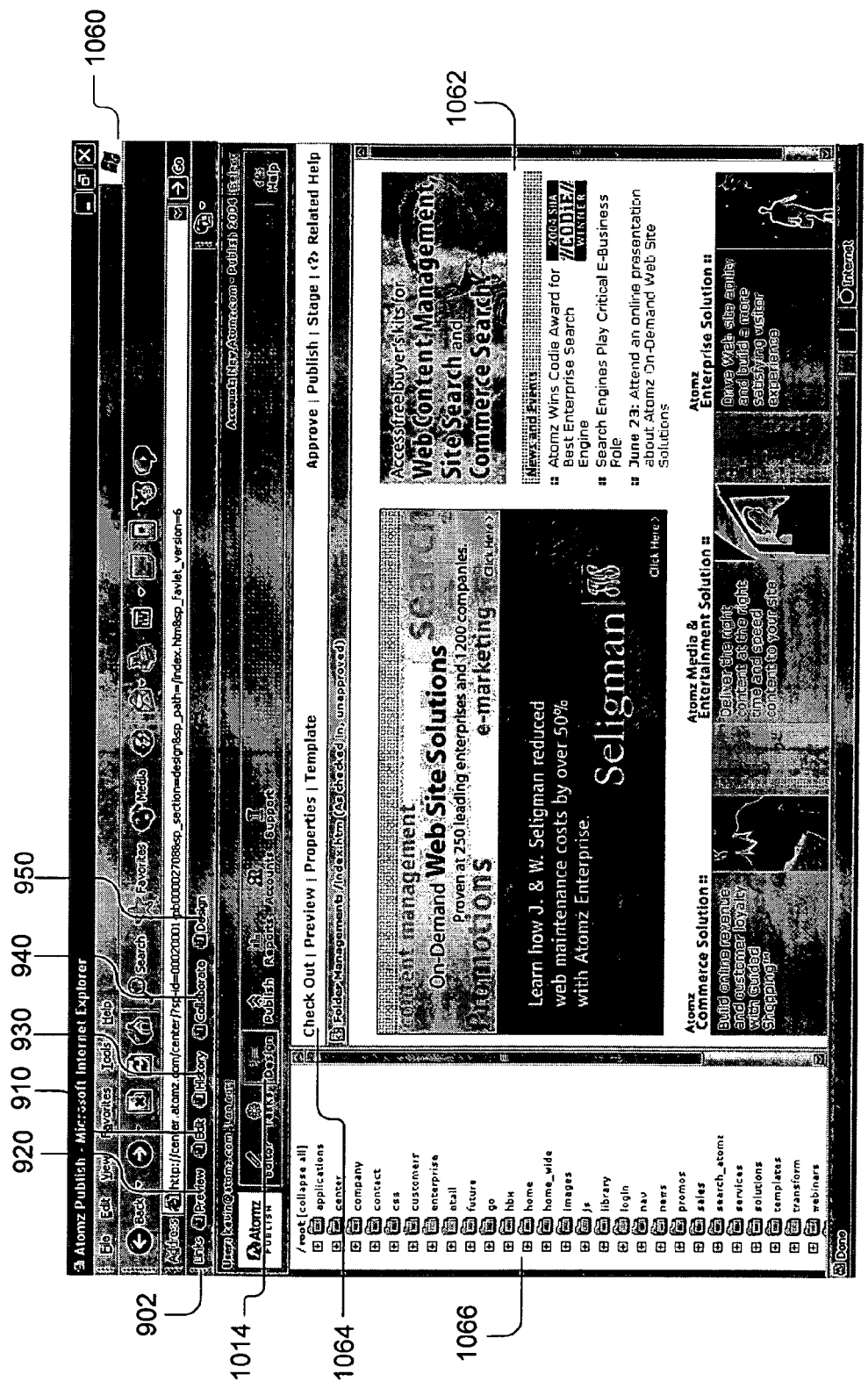
FIG. 10G illustrates a user interface after the context has been switched by choosing "Design" in FIG. 9.

FIG. 10G illustrates a user interface after the context has been switched by choosing "Design" in FIG. 9. FIG. 10G shows the design interface 1060 for a design context, which is one of the developer/creator contexts. The design user interface 1060 in one embodiment includes the context-switch mechanism (the plurality of buttons 910, 920, 930, 940, and 950 in a link tool bar 902), and design button 1014 of the developer/creator context is shown in a visually distinct manner. However, the design user interface 1060 is different in a number of respects. First, a first frame 1062 displays a view of the web page with additional tool bars and buttons 1064 more frequently used in designing web pages. Second, another frame 1066 is provided to show the file hierarchy for designer navigation. Third, neither frame includes publish now button or the other tabs associated with the editing mode so that this design mode and the functionality can be easily distinguished from the editor environment.

5. Additional Embodiments

Context-switch URL 700 enables a person to switch from one context (viewing client 412) to another context (editing client 404) and vice versa. In one embodiment, any Internet user can display a target web page using viewing client 412. It is generally undesirable, however, to allow any user to edit the target web page using editing client 404. In one embodiment, then, a user cannot use editing client 404 before he has authenticated himself.

In this embodiment, a context-switching mechanism (such as context-switch URL 700) does not grant a user any additional rights. If a user has not authenticated himself or if he has authenticated himself but has insufficient rights, invoking context-switch URL 700 from viewing client 412 will not give him access to editing client 404. Instead, in one embodiment, he will receive an error message and/or a prompt to authenticate himself.

In one embodiment, once a user has authenticated himself, his credentials are stored so that they can be referenced when he invokes context-switch URL 700. Like invoking a context-switch mechanism, storing user credentials streamlines the context-switch process. In one embodiment, user credentials are stored in a cookie on the viewing client 412.

In one embodiment, these credentials comprise a user identifier and a session identifier. In one embodiment, the session identifier comprises a hashed value that encodes the user's password, the time that the user logged in, and a timestamp.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems appears from the description. In addition, the present invention is not described with reference to any particular programming language. It will be appreciated that a variety of programming languages may be used to implement the teachings of the invention as described herein.

One skilled in the art will recognize that the particular examples described herein are merely illustrative of representative embodiments of the invention, and that other arrangements, methods, architectures, and configurations may be implemented without departing from the essential characteristics of the invention. Accordingly, the disclosure of the present invention is intended to be illustrative, but not limiting, of the scope of the invention, which is set forth in the following claims.

What is claimed is:

1. A computer-implemented method, comprising:
    displaying, on a display device, a user interface comprising an interface element for switching an application from a user mode to a developer mode of operation, wherein the application operating in the developer mode provides editing functionality not available when the application is operating in the user mode;
    in response to activation of the interface element while the application displays a file in the user mode:
        determining a target file corresponding to and comprising an editable version of the file currently displayed in the user mode, and
        switching the application from the user mode to the developer mode,
        generating a request for the target file, and
        in response to receiving the target file, displaying at least a portion of the target file in the user interface while the application is operating in the developer mode.

2. The method of claim 1, wherein the file is a webpage.

3. The method of claim 1, wherein said displaying the file further comprises determining a URL of said file.

4. The method of claim 1, wherein said generating the request further comprises:
    generating the request to indicate a portion of the file displayed when the interface element was activated.

5. The method of claim 4, wherein the at least a portion of the target file corresponds to the portion of the file displayed when the interface element was activated.

6. The method of claim 1, wherein the file is a database record, and wherein said displaying the file is in response to a database query.

7. A non-transitory computer readable medium having stored thereon one or more sequences of instructions for causing one or more microprocessors to perform: displaying, on a display device, a user interface comprising an interface element for switching an application from a user mode to a developer mode of operation, wherein the application operating in the developer mode provides editing functionality not available when the application is operating in the user mode:
    in response to activation of the interface element while the application displays a file in the user mode:
        determining a target file corresponding to and comprising an editable version of the file currently displayed in the user mode, switching the application from the user mode to the developer mode, generating a request for the target file, and in response to receiving the target file, displaying, at least a portion of the target file in the user interface while the application is operating in the developer mode.

8. The computer readable medium of claim 7, wherein the file comprises a webpage.

9. The computer readable medium of claim 7, wherein said generating the request further comprises:
    generating the request to indicate user authentication information, wherein the editing functionality in the developer mode is provided in response to a determination, based on the user authentication information, of editing access to the target file.

10. The computer readable medium of claim 7, wherein said displaying the file further comprises determining a URL of said file.

11. The computer readable medium of claim 10, wherein said generating the request further comprises:
    generating the request to indicate a portion of the file displayed when the interface element was activated.

12. The computer readable medium of claim 11, wherein the at least a portion of the target file corresponds to the portion of the file displayed when the interface element was activated.

13. The computer readable medium of claim 11, wherein prior to said displaying the at least a portion of the target file, determining the at least a portion of the target file based on the request indication of the portion of the file displayed when the interface element was activated.

14. The computer readable medium of claim 7, wherein the file is a database record, and wherein said displaying the file is in response to a database query.

15. The computer readable medium of claim 7, wherein the user mode is a query mode providing a user with a database query interface.

16. The computer readable medium of claim 7, wherein said displaying the target file comprises displaying at least a field of the database record displayed when the interface element was activated.

17. A computing device comprising:
    a memory for storing an application, wherein the application comprises computer-implemented instructions for performing operations including displaying a user interface comprising an interface element for switching the application from a user mode to a developer mode of operation, wherein the application operating in the developer mode provides editing functionality not available when the application is operating in the user mode;
    a processor communicatively coupled to the memory for executing the computer-implemented instructions of the application and thereby causing the application to display the user interface on a display device and, in response to activation of the interface element while the application displays a file in the user mode:
        determine a target file corresponding to and comprising an editable version of the file displayed in the user mode,
        switch the application from the user mode to the developer mode,
        generate a request for the target file, and
        in response to receiving the target file, display at least a portion of the target file in the user interface while the application is operating in the developer mode.

18. The computing device of claim 17, wherein the at least a portion of the target file corresponds to a portion of the file displayed when the interface element was activated.

19. The computing device of claim 18, wherein prior to said displaying the at least a portion of the target file, determining the at least the portion of the target file based on the request, the request comprising an indication of the portion of the file displayed when the interface element was activated.

20. The computing device of claim 17, wherein the computing device further comprises a network interface for communicating on a network accessible to the computing device, the file and the target file being obtained, via the network, from one or more remote servers.

21. The computing device of claim 17, wherein the interface element comprises a button and activating the interface element comprises a press of the button with an input device.

22. The computing device of claim 17, wherein the file is a database record, and wherein said displaying the file is in response to a database query.

* * * * *